Jan. 28, 1964  E. THOMANN  3,119,552
CONTROL MECHANISM FOR ROTARY COMPRESSORS
Filed Jan. 10, 1961
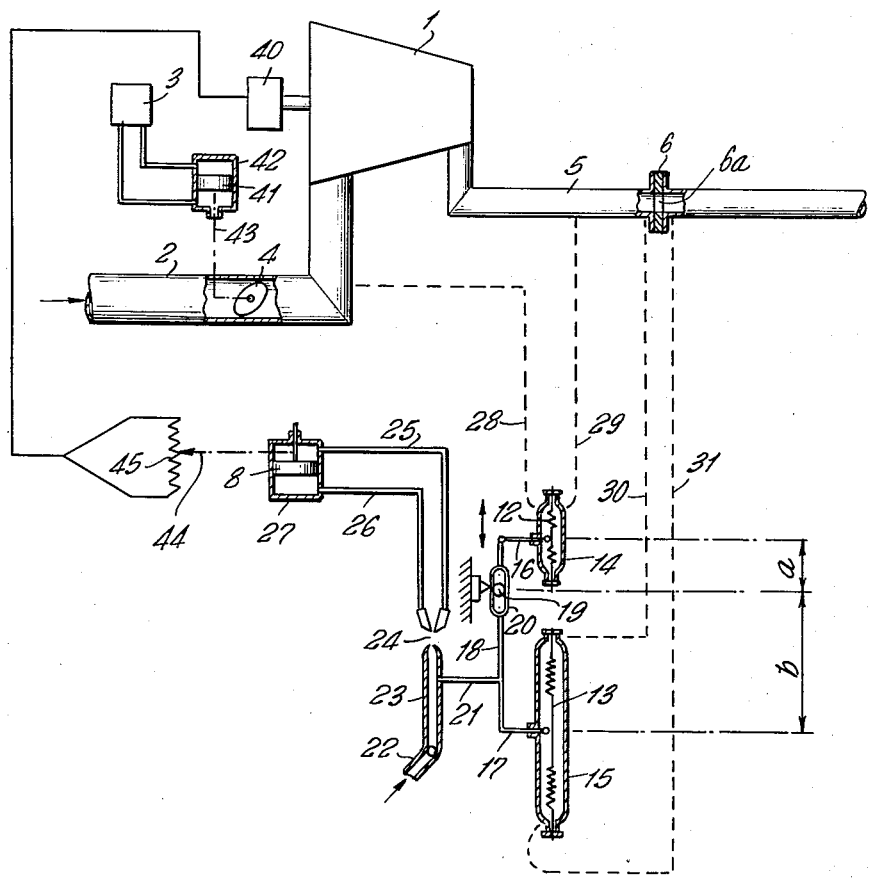
INVENTOR.
ERNST THOMANN
BY
McGlew and Toren
ATTORNEYS

United States Patent Office 3,119,552
Patented Jan. 28, 1964

3,119,552
CONTROL MECHANISM FOR ROTARY
COMPRESSORS
Ernst Thomann, Oberhausen-Sterkrade, Germany, assignor to Gutehoffnungshütte Sterkrade Aktiengesellschaft, Oberhausen-Sterkrade, Germany
Filed Jan. 10, 1961, Ser. No. 81,879
Claims priority, application Germany Jan. 27, 1960
6 Claims. (Cl. 230—114)

This invention relates in general to compressor control mechanism and in particular to a new and useful control for the operation of a rotary-type compressor.

Prior to the present invention the control of rotary compressors in respect to the surge limit or to its pumping output is accomplished by an adjusting means set to a desired or theoretical value to influence the blow-off or bypass of the discharge of the compressor, or to adjusting means for regulating the rotational speed of the compressor. The sensing means for such a control usually correspond to a pressure differential at a measuring diaphragm or orifice plate influenced by the pumping output of the compressor. In such devices the control of the pressure at a constant compressor speed is accomplished by means of a special adjusting means which actuates a throttling member in the suction line. In such cases, the measuring diaphragm is located in the suction line in front of the throttling member and when the suction pressure is constant (normally corresponding to the atmospheric pressure) then both the quantity of the surge limit and the pressure differential at the measuring diaphragm or restrictor are constant. Therefore, for practical purposes, this pressure differential has to be supervised to take care of any unusual loading or surging condition.

In many instances, however, the compressors operate under conditions which include greatly varying suction pressures within the region of from one atmosphere up to ten atmospheres or in a region of from one-tenth of an atmosphere to one atmosphere. Under such operating conditions the amount of air which flows through the restrictor or measuring diaphragm per unit of time is constant if the load or volume charge of the machine is the same. However, due to the specific weight of the gases which are handled, which is dependent upon the amount of pressure, there usually occurs at the measuring point another pressure differential which is measured in millimeters of water, height or kilograms per square centimeter. Thus, in other words, the force which is exerted by the action of the restrictor or measuring diaphragm changes in relation to the atmosphere absolute pressures.

In ordinary adjusting or control mechanisms a spring or weight is used as a counter force which counteracts any impulse pressures. If there are a large number of variations during the operation of the compressor as pointed out above, constant counter forces supplied by devices such as springs are not obtainable. Moreover, the alteration or change of mechanically acting forces, such as, for example, those which would be produced by springs, would only be possible to a very limited extent and the accuracy would decrease with use of the device.

The present invention provides means for eliminating the difficulties of the prior art constructions in providing a simple control or adjustment which is reliable during the operating conditions set forth above. The invention is based upon the consideration that the pressures in the suction and discharge in a rotary compressor change upon change of the suction pressure at the same ratio as the pressures in front and behind a restrictor or measuring diaphragm which is located in the suction line or in the pressure lines of the rotary compressor.

In accordance with the invention, there is provided two sensing membranes or similar moving members such as pistons which are influenced by pressures acting on opposite sides thereof to control the rotational speed of a compressor. One of the sensing membranes is connected on one side to the suction line of the compressor and the opposite side is connected to the discharge line, whereas another membrane is respectively connected on opposite sides to the pressure on each side of a measuring diaphragm or restrictor. A leverage system is located between the two diaphragms and is movable by movement of the diaphragm.

In an improved embodiment of the invention the membrane diaphragms are used to actuate a leverage system which is connected to a shiftable fluid discharge nozzle which is arranged to direct pressure selectively to one or the other side of a piston slidable in a control cylinder. A feature of the invention is that a variable ratio lever arm mechanism is moved by the respective control membranes. This variable lever arm may be shifted in order to change the control operation to achieve the desired equilibrium.

Accordingly, it is an object of the invention to provide an improved rotary compressor control mechanism.

A further object of the invention is to provide a control mechanism for a rotary compressor including an orifice or restrictor located in a discharge line of the compressor and a pair of separate control diaphragm members including one which is exposed to pressure of the suction line of the compressor on the opposite side, and another member membrane which senses pressure on one side of the restrictor or orifice and an opposite side which senses pressure on the opposite side of the orifice.

A further object of the invention is to provide a control mechanism for operating a rotary compressor including means responsive to the suction and discharge pressures of the compressor and to the pressures on each side of a restrictor orifice to regulate the speed of the compressor.

A further object of the invention is to provide a control mechanism for a rotary compressor which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure in the drawing indicates somewhat schematically a control mechanism for operating a rotary compressor constructed in accordance with the invention.

Referring to the drawing in particular, the invention embodied therein includes a rotary compressor generally designated 1 which is driven by a motor 40 and is arranged to take suction through a suction line 2 and discharge through a discharge line 5.

In order to control the gas flow through the compressor there is provided a pivotal damper or throttle flap 4 which is actuated by an adjusting means 3 which is effective to direct fluid pressure on alternate sides of a piston 41 arranged in a control cylinder 42 and connected by leverage indicated in dotted lines 43 to the flap 4. The flap 4 is operated by the control mechanism 3 to regulate the flow through the suction line 2 to the compressor 1.

In accordance with the invention, an orifice or restrictor plate 6 having a central opening 6a is disposed in the discharge line 5.

The invention includes a pair of control diaphragm members 12 and 13 which are tensioned within casings 14 and 15, respectively. Diaphragm 12 is exposed on one of its faces by means of connecting line 29 to the pressure in the discharge line 5 between the compressor and the restrictor or orifice member 6. The opposite side of the diaphragm 12 is exposed by means of conduit 28 to the pressure in the suction line between the flap 4 and the compressor 1. The diaphragm 13 is exposed on one of its faces to a connecting line 30 which connects to the discharge line 5 between the compressor 1 and the diaphragm 6. The opposite side of the diaphragm member 13 is exposed via connecting line 31 to the discharge line on the side of the diaphragm 6 away from the compressor 1. For the purposes of formulation, the effective surfaces of the diaphragms 12 and 13 are designated $F_1$ and $F_2$, respectively, but this is not indicated on the drawings.

Sensing pins 16 and 17 are slidably mounted in the casings 14 and 15, respectively, and disposed for movement by contact of the respective diaphragms 12 and 13. Each of the sensing pins is connected to opposite ends of a two-armed lever 18 which is pivoted on a pivot member 19. The two-armed lever 18 includes a rounded portion defining a slot 20 intermediate its length which encompasses the pivot 19 and which may be adjusted in respect thereto in order to vary the ratio of movement produced by the pins 16 and 17.

A jet pipe or nozzle 23 having an opening 24 is connected to the two-armed lever by a connecting arm 21. Movement of the lever 18 causes movement of the nozzle 23 to effect discharge of a pressurized fluid from a conduit 22 selectively into conduits 25 and 26 which feed into a cylinder 27 on alternate sides of a sliding piston 8, respectively. When the two membranes 12 and 13 and the lever 18 are in their ordinary or normal position, the nozzle tip 24 is directed exactly between the open mouth of the two lines 25 and 26 so that the piston is stabilized intermediate the length of the cylinder 27. The equilibrium condition for the two-armed lever 18 is represented by the formula $$(p_2-p_1).F_1.a-(p_2-p_3)F_2.b=o$$

wherein $p_1$ is the pressure in the suction line 2, $p_2$ is the pressure in the discharge line 5 in front of the restrictor 6 and $p_3$ is the pressure in the discharge line 5 behind the restrictor 6, $F_1$ is the acting surface of the membrane 12, $F_2$ is the acting surface of the membrane 13, $a$ is the length of the lever arm which is influenced by the membrane 12 and $b$ is the length of the lever arm which is influenced by the membrane 13.

When the equilibrium position is disturbed the lever 18 is moved about its axis 19 in one or the other direction. When the differential pressure is too large, that is, $p_2-p_1$, the membrane 12 is rocked in a counter-clockwise direction so that the jet pipe 23 moves to the right and the pressure fluid is directed into the line 25 which causes the piston 8 to move downwardly. When the other differential pressure $p_2-p_3$, which acts on the membrane 13, is predominant then the lever 18 is rocked in an opposite direction, that is, in a clockwise direction and the jet pipe 23 is moved toward the left so that the air pressure reaches the line 26 and moves the piston 8 upwardly. By moving the rocking axis 19 to change the lever arm $a$ to $b$, the equilibrium position may be adapted to the operating conditions desired and thus may be set between the required limits.

The piston 8 is connected to a sensing finger 44 which is moved over a resistance wire 45 of a control circuit for the compressor motor 40 to adjust the speed of rotation thereof. Control is thus effected by adjusting the compressor speed. Suitable other control means for the compressor rotational speed may be provided and be responsive to the movement of the piston 8 for similar control mechanism in accordance with the differential of pressure sensed at the suction and discharge lines and also in respect to the pressure differential sensed across a restrictor orifice.

In case a disturbed pressure equilibrium situation results the lever mechanism 18 of the diaphragm may be blocked against movement by disposing a stop or similar abutment in the equilibrium position to control the corrective action before it is initiated.

While a specific embodiment of the invention has been shown and described in detail to illustrate the application of the invention principles, it will be understood that the invention may be embodied otherwise without departing from such principles.

What is claimed is:

1. In a rotary compressor having a suction line and a discharge line, the improvement comprising a control mechanism including a restrictive orifice adapted to be disposed in said discharge line, first pressure differential sensing means adapted to be connected to said suction line and said discharge line to sense the difference in pressure therebetween, second differential pressure sensing means adapted to be connected to said discharge line on each side of said restrictor orifice to sense the difference in pressure across said orifice, and control means connected to said first and second pressure differential sensing means and movable in accordance with a ratio of the difference of said first and second pressure sensing means and adapted to be connected to said compressor to control the output thereof, said control means including first and second sensing fingers disposed in alignment with said first and second diaphragms and displaceable thereby, said movable member comprising a lever connecting each of said first and second sensing fingers.

2. In a rotary compressor having a suction line and a discharge line, the improvement comprising a control mechanism including a restrictor orifice adapted to be disposed in said discharge line, a first diaphragm, means for connecting one side of said diaphragm to said suction line and the opposite side of said diaphragm to said discharge line, a second diaphragm, means for connecting one side of said diaphragm to said discharge line on one side of said restrictor orifice, means for connecting the opposite side of said second diaphragm to said discharge line on an opposite side of said restrictor orifice, and control means connected to said first and second diaphragms including a member movable in accordance with movement thereof, to regulate flow through said compressor, said control means including a piston slidable in a cylinder, a first conduit having an inlet and a discharge end and a second conduit having an inlet and a discharge end, the discharge end of said first conduit discharging into said cylinder on one side of said piston and the discharge of said second conduit discharging into said cylinder on the other side of said piston, a fluid medium line having a discharge nozzle movable between an inoperative position and positions in alignment with the inlets of said first and second conduits, and means connecting said discharge nozzle with said movable member, whereby in response to the movement of said movable member said discharge nozzle discharges fluid into one of said first and second conduits.

3. In a rotary compressor according to claim 2, wherein said control means includes a motor for operating said compressor and an electrical control for controlling the speed of said motor connected to said member and movable thereby to vary the speed of said motor means.

4. In a rotary compressor according to claim 1, wherein said lever includes a slot defined thereon, and a pivot including a portion disposed in said slot pivotally supporting said lever.

5. In a rotary compressor having a suction line and a discharge line, the improvement comprising a control mechanism including a restrictor orifice adapted to be disposed in said discharge line, first pressure differential sensing means adapted to be connected to said suction line and said discharge line to sense the difference in pressure therebetween, second differential pressure sensing means adapted to be connected to said discharge line on each side of said restrictor orifice to sense the difference in pressure across said orifice, and control means connected to said first and second pressure differential sensing means and movable in accordance with a ratio of the difference of said first and second pressure sensing means and adapted to be connected to said compressor to control the output thereof, said control means including a piston slidable in a cylinder, a first conduit having an inlet and a discharge end, and a second conduit having an inlet and a discharge end, the discharge end of said first conduit discharging into said cylinder on one side of said piston and the discharge of said second conduit discharging into said cylinder on the other side of said piston, a fluid medium line having a discharge nozzle movable between an inoperative position and positions in alignment with the inlets of said first and second conduits, and means connecting said discharge nozzle with said movable member, whereby in response to the movement of said movable member said discharge nozzle discharges fluid into one of said first and second conduits.

6. In a rotary compressor having a suction line and a discharge line, the improvement comprising a control mechanism including a restrictor orifice adapted to be disposed in said discharge line, a first diaphragm, means for connecting one side of said diaphragm to said suction line and the opposite side of said diaphragm to said discharge line, a second diaphragm, means for connecting one side of said diaphragm to said discharge line on one side of said restrictor orifice, means for connecting the opposite side of said second diaphragm to said discharge line on an opposite side of said restrictor orifice, and control means connected to said first and second diaphragms including a member movable in accordance with movement thereof to regulate flow through said compressor, said control means including first and second sensing fingers disposed in alignment with said first and second diaphragms and displaceable thereby, said movable member comprising a lever connecting each of said first and second sensing fingers, said control means including a piston slidable in a cylinder, a first conduit having an inlet and a discharge end and a second conduit having an inlet and a discharge end, the discharge end of said first conduit discharging into said cylinder on one side of said piston and the discharge of said second conduit discharging into said cylinder on the other side of said piston, a fluid medium line having a discharge nozzle movable between an inoperative position and positions in alignment with the inlets of said first and second conduits, and means connecting said discharge nozzle with said movable member, whereby in response to the movement of said movable member said discharge nozzle discharges fluid into one of said first and second conduits, said piston being operatively connected with an electric control which in turn controls the speed of the motor of the compressor.

References Cited in the file of this patent

UNITED STATES PATENTS

| | | |
|---|---|---|
| 621,996 | Duncan | Mar. 28, 1899 |
| 1,910,202 | Crago | May 23, 1933 |
| 2,042,374 | Wunsch et al. | May 26, 1936 |
| 2,353,201 | Talbot | July 11, 1944 |
| 2,385,664 | Warner | Sept. 25, 1945 |
| 2,408,851 | Hillier | Oct. 8, 1946 |
| 2,459,000 | Morris | Jan. 11, 1949 |
| 2,490,188 | Ziebolz | Dec. 6, 1949 |
| 2,886,968 | Johnson | May 19, 1959 |
| 3,047,210 | Best | July 31, 1962 |

FOREIGN PATENTS

| | | |
|---|---|---|
| 543,136 | France | Aug. 28, 1922 |